US006557905B2

(12) United States Patent
Mack et al.

(10) Patent No.: US 6,557,905 B2
(45) Date of Patent: May 6, 2003

(54) ANTI-ROTATIONAL SUBMERSIBLE WELL PUMP ASSEMBLY

(75) Inventors: John J. Mack, Tulsa, OK (US); Brown L. Wilson, Tulsa, OK (US); Donn J. Brown, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/863,965

(22) Filed: May 23, 2001

(65) Prior Publication Data

US 2002/0175519 A1 Nov. 28, 2002

(51) Int. Cl.[7] ................................................ F16L 25/00
(52) U.S. Cl. ...................... 285/330; 285/913; 285/387; 285/388
(58) Field of Search ............................... 285/913, 330, 285/351, 354, 387, 388

(56) References Cited

U.S. PATENT DOCUMENTS

| 2,314,867 A | * | 3/1943 | Boynton ..................... 285/111 |
| 2,501,217 A | | 3/1950 | Hawn |
| 3,623,753 A | * | 11/1971 | Henry ......................... 285/330 |
| 4,209,193 A | * | 6/1980 | Ahlstone ...................... 285/24 |
| 4,350,911 A | | 9/1982 | Wilson et al. |
| 4,500,226 A | * | 2/1985 | Romand-Monnier et al. .... 285/388 |
| 4,549,756 A | * | 10/1985 | Basile ......................... 285/31 |
| 4,658,895 A | * | 4/1987 | Brisco ........................ 166/237 |
| 4,913,630 A | | 4/1990 | Cotherman et al. |
| 5,474,334 A | * | 12/1995 | Eppink ......................... 175/74 |
| 6,352,288 B1 | * | 3/2002 | Calkins ....................... 285/305 |

FOREIGN PATENT DOCUMENTS

DE        3812211 A  * 11/1989

* cited by examiner

*Primary Examiner*—Lynne H. Browne
*Assistant Examiner*—Aaron Dunwoody
(74) *Attorney, Agent, or Firm*—Bracewell & Patterson, L.L.P.

(57) ABSTRACT

A submersible well pump assembly using threaded connections, the submersible well pump assembly having a first housing, a second housing, a clamp ring, and at least one anti-rotation member. The first housing has an end having an outer surface, an end face, and a shoulder on that outer surface. The second housing has an end having an outer surface and an end face. The outer surface of the second housing has external threads formed thereon and the end face of the second housing abuts the end face of the first housing. The clamp ring is rotatably and slidably carried on the first housing and has internal threads that engage the external threads of the second housing. The clamp ring also has an internal shoulder that engages the shoulder of the first housing. To keep the connection secure, the assembly has at least one anti-rotation member having a cooperative element on each end of each housing to inhibit rotation of one housing relative to the other.

18 Claims, 3 Drawing Sheets

US 6,557,905 B2

ANTI-ROTATIONAL SUBMERSIBLE WELL PUMP ASSEMBLY

FIELD OF THE INVENTION

The present invention relates to submersible well pump assemblies used to produce hydrocarbons from oil and gas wells. More particularly, the present invention relates to the specific manner in which the various components of a submersible well pump assembly are joined.

BACKGROUND OF THE INVENTION

Submersible well pump assemblies generally include a pump to propel well bore fluid and a motor to drive the pump. Centrifugal pumps have an equalizer or seal section to isolate the lubricant fluid in the interior of the motor compartment from the well bore fluid while equalizing pressure between the well bore fluid and the interior of the motor compartment. Other components may also be included in appropriate subsurface environments such as a gas separator, and in the case of a progressive cavity pump, a gearbox that reduces rotational speed.

Prior submersible well pump assemblies typically are joined by bolts using flanges. A disadvantage of such a connection is the difficulty of making the necessary connection out in the field. The entire assembly must by assembled in a piecewise fashion while on the drilling platform. Aligning the flanges and inserting and securing the bolts can be a cumbersome and time-consuming procedure, particularly in cold or harsh weather.

Another disadvantage concerns the restriction in fluid flow caused by the flanged joint. The open space of a well bore of a producing well generally is limited by the inner diameter of the casing. Thus, the outer diameter of the submersible well pump assembly must fit within that inner diameter. Where a flanged connection is made, the diameter of the internal flow passage for well bore fluid is necessarily reduced to accommodate the width of the flange lip. The narrowed passage reduces throughput and can accelerate the wear rate of end connections, particularly when abrasive fluids are being pumped.

SUMMARY OF THE INVENTION

The present invention comprises a submersible well pump assembly having at least two housings, a clamp ring, and at least one anti-rotation member. The first housing has an end having an outer surface, an end face, and a shoulder on that outer surface. The second housing has an end having an outer surface and an end face. The outer surface of the second housing has external threads formed thereon and the end face of the second housing abuts the end face of the first housing.

The clamp ring is rotatably and slidably carried on the first housing and has internal threads that engage the external threads of the second housing. The clamp ring also has an internal shoulder that engages the shoulder of the first housing. To keep the connection secure, the assembly has at least one anti-rotation member having a cooperative element on each end of each housing to inhibit rotation of one housing relative to the other.

BRIEF DESCRIPTION OF THE DRAWINGS

So that the manner in which the features, advantages, and objects of the invention are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope, as the invention may admit to other equally effective embodiments.

DETAILED DESCRIPTION

Figure 1A:
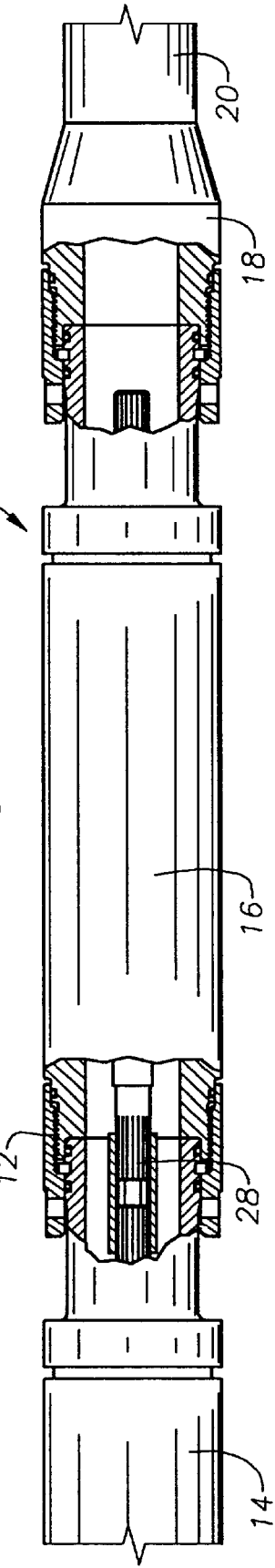
FIGS. 1A, 1B, and 1C comprise a partial cross-sectional side view of a submersible well pump assembly having threaded connections in accordance with an embodiment of the present invention.
Figure 1B:
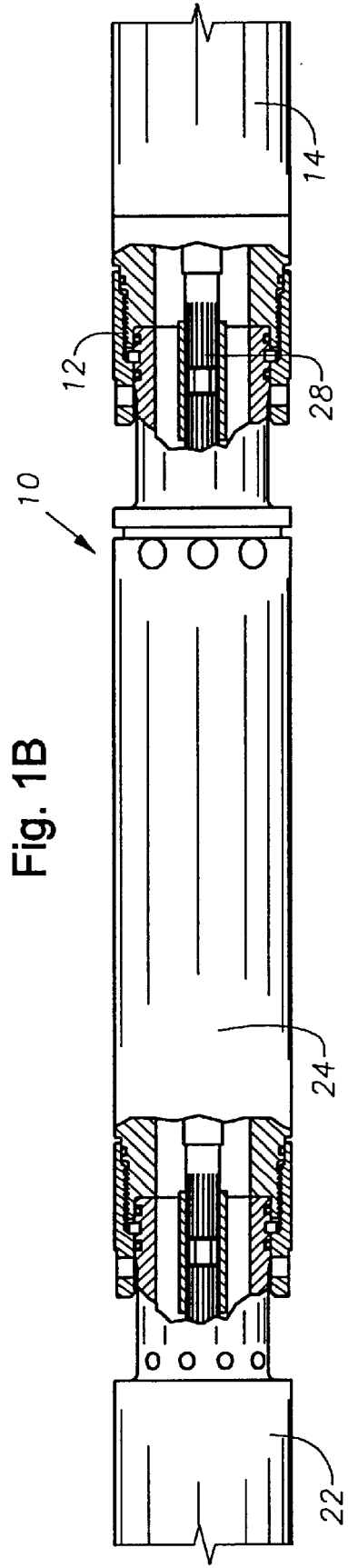
Figure 1C:
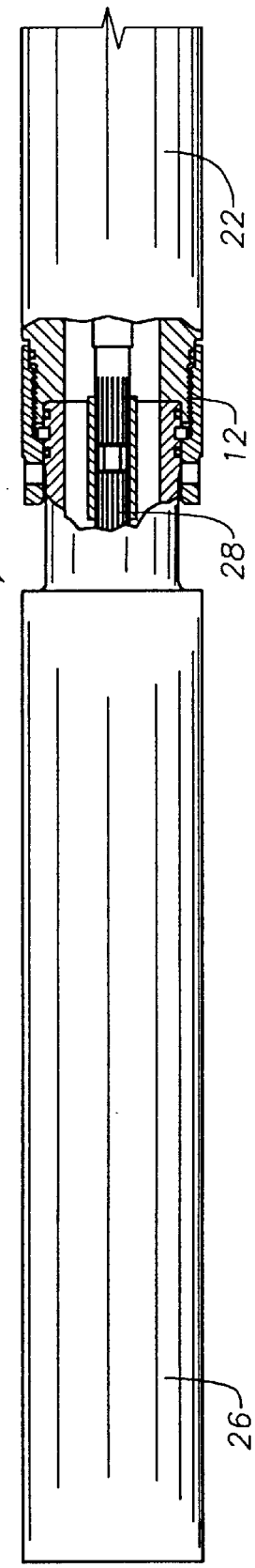

FIGS. 1A, 1B, and 1C illustrate a portion of a submersible well pump assembly 10 having threaded connections 12 interconnecting various components of pump assembly 10. The components of pump assembly 10 shown in FIG. 1A comprise a first pump 14, a second pump 16, a discharge head 18, and production tubing 20. In this embodiment, pump 14 connects to pump 16 and discharges into the intake of pump 16. The pumps 14, 16 are conventional centrifugal pumps having a plurality of impellers and diffusers (not shown). Other pump types, such as a progressive cavity pump, can be used. Pump 16 connects to discharge head 18 which connects to production tubing 20. Discharge head 18 directs the discharge of pump 16 into the production tubing 20 through which the well bore fluid is transported to the surface.

The components of pump assembly 10 shown in FIG. 1B comprise an equalizer 22, a gas separator 24, and the opposite end of pump 14 from that shown in FIG. 1A. The equalizer 22 connects to gas separator 24, and gas separator 24 connects to the intake of pump 14. As stated above, the equalizer 22 serves to isolate the lubricant fluid in the interior of the motor compartment from the well bore fluid while equalizing pressure between the well bore fluid and the interior of the motor compartment. In the embodiment shown in FIG. 1B, the gas separator 24 has inlet ports on one end and outlet ports on the opposite end. Well bore fluid, which is typically a mixture of liquid and entrained gas, enters the inlet ports and, as the fluid moves through the gas separator 24, the gas is separated from the liquid. The gas is directed through the outlet ports and discharged into the annular region between the casing and the pump assembly 10. The liquid portion of the well bore fluid passes along the central core of pump assembly 10. In FIG. 1B, the liquid portion is delivered from the gas separator 24 to the intake of pump 14.

FIG. 1C shows a motor 26 connected to the opposite end of equalizer 22 from that shown in FIG. 1B. Motor 26 is a three-phase electrical motor that rotates an interlocking series of shafts 28 extending from the motor 26 through each of the components of pump assembly 10 to the discharge head 18.

Figure 2:
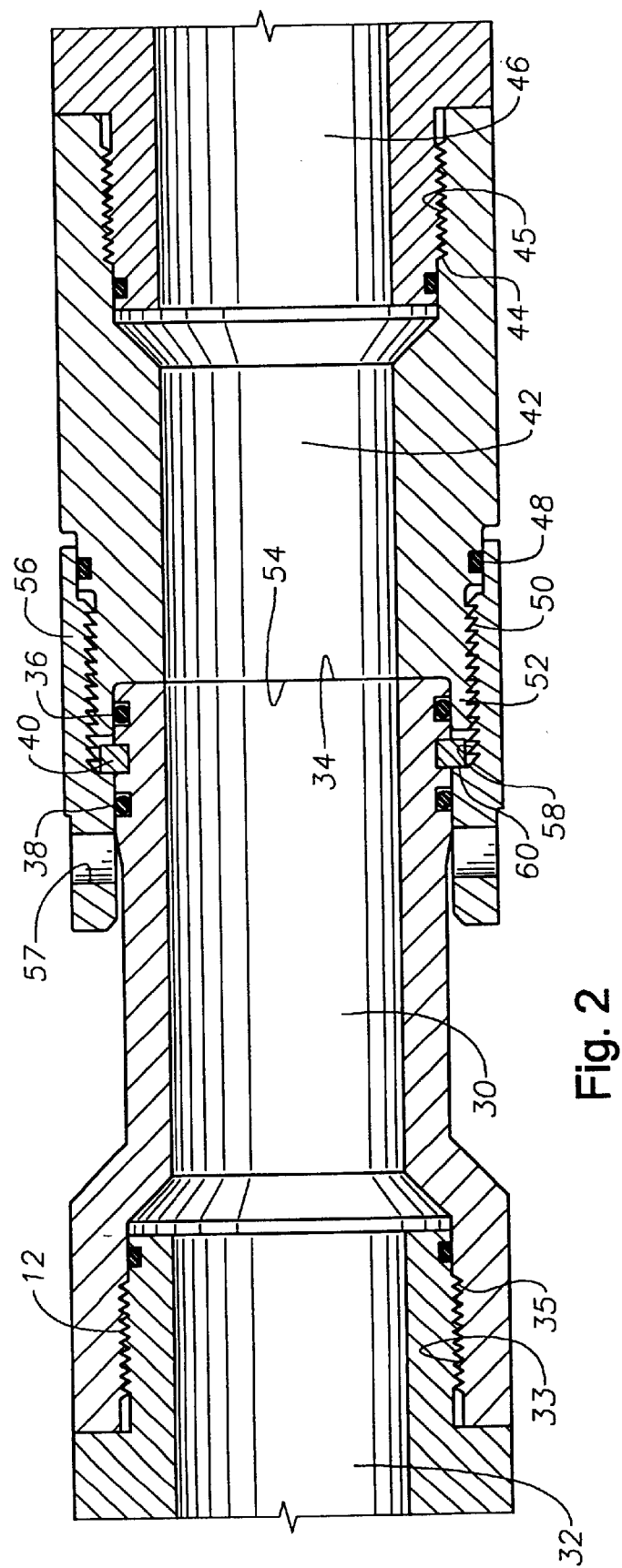
FIG. 2 is an enlarged cross-sectional side view of one of the threaded connectors of the submersible well pump assembly of FIGS. 1A, 1B, and 1C.

Referring to FIG. 2, each connection 12 has a first adapter 30 having a first end and a second end. First adapter 30 connects at its first end to a first component 32 of pump assembly 10 by a threaded, sealed connection made in a conventional manner, and thus may be considered to be an integral end of one of the housings of one of the components. First component 32 has an externally threaded end 33 that engages internal threads 35 of the first end of adapter 30. First component 32 may be motor 26, equalizer 22, gas separator 24, or pump 14. First adapter 30 is a tubular member having at its second end an end face 34. In the particular embodiment shown in FIG. 2, the second end has an outer surface in which a first seal 36 and a second seal 38 are placed in circumferential grooves. Between the seals 36, 38 is a shoulder ring 40 secured to the outer surface. Shoulder ring 40 is a split ring that protrudes radially from the outer surface of adapter 30. FIG. 2 also shows a second adapter 42. Similar to the first adapter 30, the second adapter 42 has a first end and a second end. The first end has internal threads 44 that connect to external threads 45 of a second component 46 of the pump assembly 10. As before, that connection is a threaded, sealed connection made in a conventional manner, and, also as before, second component 46 is one of the above-identified pump assembly components. Second adapter 42 is a tubular member extending from its first end to its second end. The second end has an outer surface in which a seal 48 is located in a circumferential groove. The outer surface of the second adapter 42 also has external threads 50 formed thereon. In the particular embodiment shown in FIG. 2, the second end has a lip 52 extending around a recessed end face 54, causing the end face 54 to be recessed from the tip of the second end. End face 34 of first adapter 30 abuts end face 54 and slides within lip 52. The seal 36 seals against the inner surface of lip 52.

A clamp ring 56 is used to join the first adapter 30 and second adapter 42. The clamp ring 56 is carried on and can slide and rotate on the tubular housing of first adapter 30. The clamp ring 56 has internal threads 58 that can engage the external threads 50 of the second adapter 42. The clamp ring 56 also has an internal shoulder 60 at the base of threads 58 to engage the shoulder ring 40 of first adapter 30. The clamp ring 56 has an inner surface that forms a sealing surface for the second seal 38. Clamp ring 56 also has a smooth cylindrical internal surface at its end for sealing against seal 48 of second adapter 42. A plurality of holes 57 may be located in clamp ring 56 to receive prongs of a spanner wrench (not shown) to rotate clamp ring 56.

Figure 3A:
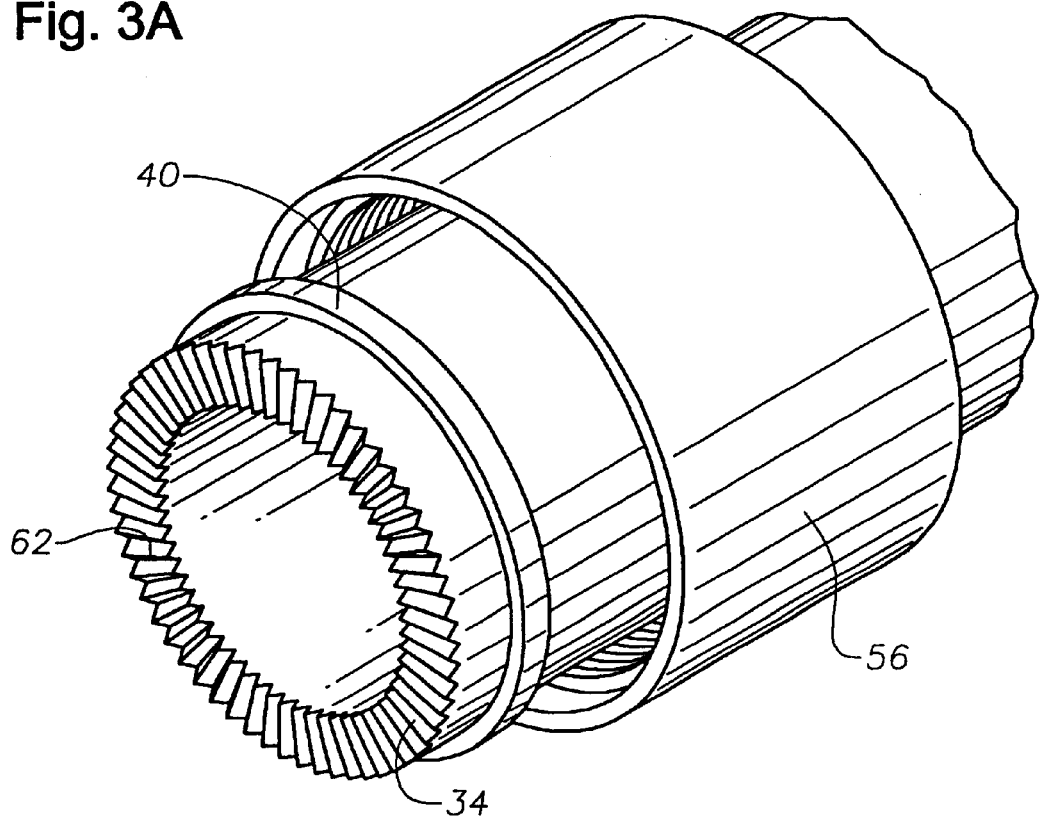
FIG. 3A is a perspective view of a first adapter of the threaded connector of FIG. 2.
Figure 3B:
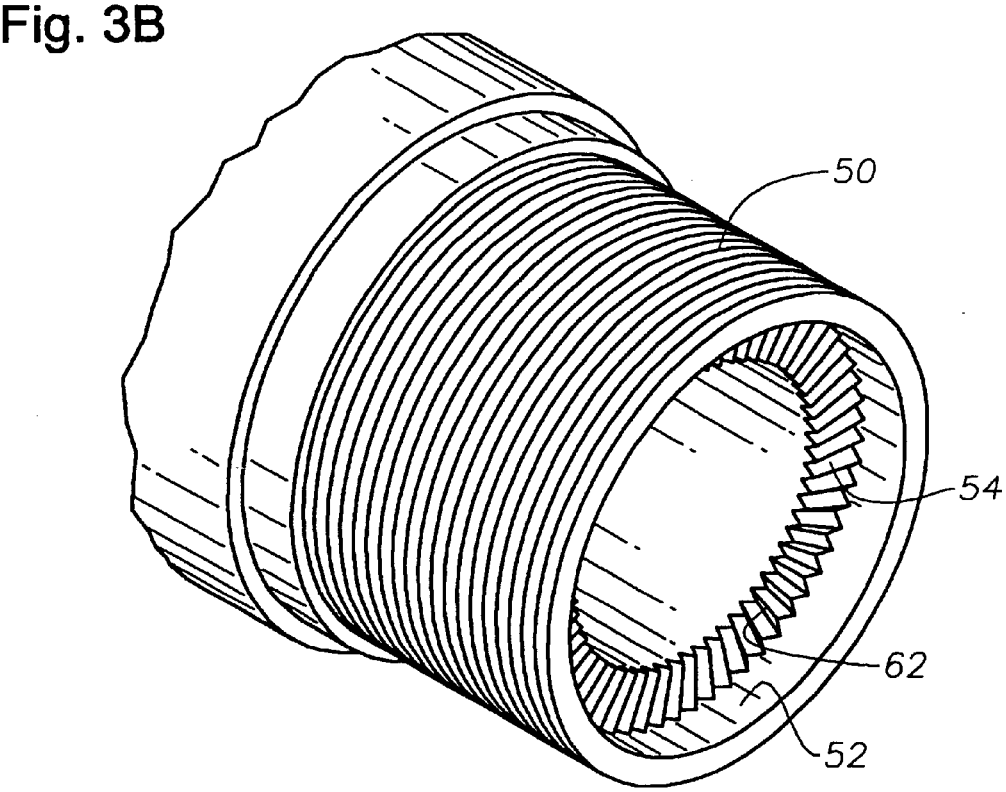
FIG. 3B is a perspective view of a second adapter of the threaded connector of FIG. 2.

In the embodiment shown in FIGS. 3A and 3B, the end faces 34, 54 have intermeshing teeth 62 that interlock to inhibit rotation of one adapter relative to the other once placed in compression. The teeth shown are triangular ridges having radial symmetry and are integrally formed on each end face 34, 54. While this particular embodiment shows many teeth, as few as one on each end face would achieve its intended purpose. Alternate anti-rotation elements can be used such as crosshatched or knurled end face surfaces. Instead of being on the end faces 34, 54, the anti-rotation elements may also be located on the outer surface of the second end of first adapter and the inner surface of lip 52.

In operation, the adapters 30, 42 are aligned and positioned so that the end faces 34, 54 abut. Lip 52 receives end face 34. Clamp ring 56 is slid along adapter 30 until the internal threads 58 engage the external threads 50. When the clamp ring 56 is rotated to advance toward the second adapter 42, the internal shoulder 60 comes to bear on the shoulder ring 40 of the first adapter 30. The force it bears from the clamp ring 56 causes the first adapter 30 and second adapter 42 to move toward each other until the end faces 34, 54 are compressed against each other. A spanner wrench is used to tighten the clamp ring 56.

An alternate embodiment not explicitly shown in the figures is one in which the tubular first adapter is integrally formed on one of the components. Similarly, the second adapter is integrally formed on another component. The components can be directly joined at their ends by engaging the clamp ring to pull the end faces together. To connect components together in this fashion, each component has opposite adapters on its respective ends.

If a progressive cavity pump (not shown) is used instead of a centrifugal pump, another component would be a gear box (not shown) to reduce the rotational speed of the motor 26. In that and perhaps other situations, no equalizer or gas separator would be used. For example, if the well bore fluid is essentially liquid, a gas separator may not be required even though a centrifugal pump is used.

The present invention eliminates the flange connections in submersible well pump assemblies, using threaded connections instead. The improved connection allows for increased wall thickness, thus increasing strength while still allowing a larger flow diameter for the well bore fluid. The increased strength allows the pump assembly to withstand higher flexure loads such as may be encountered in deviated wells. Because of the threaded connections, not only is assembly easier, but manufacturing is easier as well because multiple bolt hole patterns with threaded holes are no longer required. Different embodiments of the present invention can employ thread-up or thread-down designs. The quick and easy manner in which various components of a pump assembly may be joined, depending on the requirements imposed by the subsurface environment, demonstrate the versatility and utility of the present invention.

While the invention has been particularly shown and described with reference to a preferred embodiment, it will be understood by those skilled in the art that various changes in form and detail may be made therein without departing from the spirit and scope of the invention.

We claim:

1. A submersible well pump assembly comprising:
   a first housing and a second housing, one of the housings containing a rotatable pump;
   an end of the first housing having an outer surface and an end face;
   a shoulder on the outer surface of the first housing;
   an end of the second housing having an outer surface and an end face, the outer surface of the second housing having external threads formed thereon;
   a clamp ring rotatably and slidably carried on the first housing, the clamp ring having internal threads that engage the external threads of the second housing, the clamp ring further
   having an internal shoulder that engages the shoulder of the first housing to secure the housings together;
   a rotatively driven shaft within at least one of the housings for driving the pump;
   at least one anti-rotation member having a cooperative element on said end of each housing to inhibit rotation of one housing relative to the other housing due to rotation of the shaft.

2. The assembly of claim 1 wherein the end of the second housing further comprises a lip surrounding the end face of the second housing.

3. The assembly of claim 1 wherein the cooperative element comprises one or more teeth.

4. The assembly of claim 1 wherein the shoulder of the first housing comprises a split ring secured in a circumferential groove in the outer surface of the first housing.

5. The assembly of claim 2 further comprising a seal between the lip and the outer surface of the first housing.

6. The assembly of claim 5 further comprising a seal between the clamp ring and the outer surface of the first housing.

7. A submersible well pump assembly having a plurality of components including an electrical motor having a driven shaft that rotates a pump, each component having a tubular housing, the assembly also having at least one connector to connect two of the components, the connector comprising:

a first adapter having a first end secured to one of the components; a second end of the first adapter having an outer surface and an end face;

a load-bearing shoulder on the outer surface of the first adapter;

a second adapter having a first end secured to another one of the components;

a second end of the second adapter having an outer surface and an end face, the outer surface of the second adapter having external threads formed thereon, the end face of the second adapter abutting the end face of the first adapter;

a clamp ring rotatably and slidably carried on the first adapter, the clamp ring having internal threads that engage the external threads of the second adapter and further having an internal shoulder that engages the load-bearing shoulder; and at least one anti-rotation member having a cooperative element on each end face to inhibit rotation of the first adapter relative to the second adapter due to rotation of the motor, shaft and pump.

8. The assembly of claim 7 wherein the connector further comprises a lip surrounding the end face of the second adapter.

9. The assembly of claim 7 wherein the cooperative element comprises one or more teeth.

10. The assembly of claim 7 wherein the load-bearing shoulder comprises a split ring secured in a circumferential groove in the outer surface of the first adapter.

11. The assembly of claim 8 wherein the connector further comprises a seal between the lip and the outer surface of the first adapter.

12. The assembly of claim 11 wherein the connector further comprises a seal between the clamp ring and the outer surface of the male end.

13. The assembly of claim 7 wherein at least one adapter has a hole therethrough transverse to a longitudinal axis of the adapter.

14. A submersible well pump assembly having a plurality of components including an electrical motor with a driven shaft that rotates a pump, each component having a tubular housing, the assembly also having at least one connector to connect two of the components, the connector comprising:

a first adapter having a first end secured to one of the components;

a second end of the first adapter having an outer surface and an end face;

a load-bearing shoulder on the outer surface of the first adapter;

a second adapter having a first end secured to another one of the components;

a second end of the second adapter having an outer surface and an end face, the outer surface of the second adapter having external threads formed thereon, the end face of the second adapter abutting the end face of the first adapter;

a clamp ring rotatably and slidably carried on the first adapter, the clamp ring having internal threads that engage the external threads of the second adapter and further having an internal shoulder that engages the load-bearing shoulder;

a lip surrounding the end face of the second adapter;

a seal between the lip and the outer surface of the first adapter; and a plurality of intermeshing teeth on each end face to inhibit rotation of the first adapter relative to the second adapter.

15. The assembly of claim 14 wherein the load-bearing shoulder comprises a split ring secured in a circumferential groove in the outer surface of the first adapter.

16. The assembly of claim 14 wherein the connector further comprises a seal between the clamp ring and the outer surface of the first adapter.

17. The assembly of claim 14 wherein at least one adapter has a hole therethrough transverse to a longitudinal axis of the adapter.

18. A method of pumping fluid from a well, comprising:

providing first and second housings, one of the housings containing a rotatable pump and the other of the housings containing a rotatable drive shaft;

providing a shoulder on the outer surface of the first housing;

providing external threads on the second housing;

placing a clamp ring with internal threads on the first housing, inserting the first housing into the second housing, then rotating the clamp ring relative to the housings to secure the internal threads to the external threads, thereby connecting the first and second housings together;

while connecting the first and second housing together, engaging an anti-rotation member in an end of one of the housings with a cooperative element in an end of the other of the housings; then lowering the first and second housings into a well;

rotating the drive shaft and thus the pump, thereby pumping well fluid from the well; and resisting rotation of the housings relative to each other as a result of the engagement of the anti-rotation member with the cooperative element.

* * * * *